United States Patent Office 3,370,049

Patented Feb. 20, 1968

1

3,370,049

VULCANIZATION PROCESS

Logan V. Miller, Park Forest, and Laurence E. Stanton, Lisle, Ill., assignors to Nalco Chemical Company, Chicago, Ill., a corporation of Delaware No Drawing. Filed Oct. 19, 1965, Ser. No. 498,106
12 Claims. (Cl. 260—79.5)

This invention relates to a novel process for vulcanizing rubber. More particularly, the invention concerns a novel process for vulcanizing rubber by heating said rubber in the presence of sulfur and an accelerating amount of a compound of this invention to effect said vulcanization.

The process of vulcanizing rubber may broadly be defined as a process wherein an elastomer or rubbery polymer is cross-linked to form a tough, strong and highly-elastic material known as cured rubber. Dry rubber, in a vulcanization process, is normally mixed with sulfur and thereafter heated to effect vulcanization. It is believed that the rubbery polymers or elastomers contain a number of unsaturated groups or double bonds in their molecules which react in some manner with sulfur and thereafter cross-link the polymer chains to produce cured rubber.

In addition to the sulfur, other materials known as accelerators are normally added to reduce the vulcanization period to a commercially acceptable length of time. Rubber which is vulcanized in the presence of sulfur without an accelerator may not be completely vulcanized for even as long as several days. Further, unreacted sulfur which is present due to incomplete vulcanization is undesirable in the final product, since an excess of sulfur will cause crystallization of sulfur to occur at the surface of the rubber.

A wide variety of compounds are used as accelerators to increase the rate of vulcanization. The function of the accelerator is to increase the rate of vulcanization, and, further, to assist in producing rubber having superior properties such as increased strength, and elasticity. Organic compounds such as certain types of amines and thiocarbamates are well-known accelerators, while the principal inorganic accelerator is zinc oxide.

The use of zinc oxide as a vulcanization accelerator has become almost universal since its effectiveness was discovered in about 1920. This compound performs two functions during the vulcanization. First of all, the zinc oxide accelerates the vulcanization reaction between the rubbery polymers and sulfur. Secondly, it has been found that zinc oxide activates organic accelerators which in turn accelerate the sulfur-rubber reaction.

However, the use of zinc oxide as an accelerator in the rubber vulcanization process does have a number of drawbacks which limit that compound's usefulness in the rubber manufacturing art. Zinc oxide is a very dense material, and a relatively large amount of that material is necessary to manufacture a given volume of rubber. Rubber, normally, is sold by volume and not by weight, which means that for a given volume of rubber more zinc oxide must be used than would be needed if a less dense material were to be used. Also, most vulcanization processes, even with the use of zinc oxide, still require the additional use of expensive organic accelerators to achieve satisfactory vulcanization rates. Further, use of zinc oxide as an accelerator does not give the optimum strength which may be achieved in a particular rubber, nor are optimum elasticity and toughness properties achieved in all cases. The state of the rubber manufacturing art would be greatly advanced if a process for vulcanizing rubber could be derived wherein a compound could be used which would function as a rubber accelerator and as a secondary accelerator or activator as does zinc oxide, and further provide superior properties in the final product.

2

Therefore, it is an object of this invention to provide a process for vulcanizing rubber without the use of zinc oxide.

Another object of this invention is to provide a novel class of compounds which may be used to accelerate the vulcanization of rubber.

Yet another object of this invention is to provide a process for vulcanizing rubber which produces a product of superior strength, elasticity and toughness.

A specific object of this invention is to provide a process for vulcanizing rubber wherein sulfur and an accelerating amount of the compounds of this invention are incorporated into said rubber prior to said vulcanization.

Other objects will appear hereinafter.

In accordance with the invention, it has now been discovered that these and other objects of this invention may be accomplished in the following manner. Broadly, the process of this invention comprises vulcanizing rubber by incorporating sulfur and an accelerating amount of a compound having the formula:

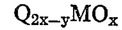

$$Q_{2x-y}MO_x$$

into said rubber followed by heating to effect vulcanization of said rubber.

M, in the above formula, is an atom of the group listed in the Periodic Table selected from the group consisting of IB, IIIA, IVA, IVB, VIB and VIII, $x$ is an integer of 1–4 and $y$ is the valence of said atom. Preferred atoms include iron, chromium, aluminum, gallium, copper, cobalt, nickel, silver, gold, zinc, cadmium, silicon, germanium, tin, lead, titanium, zirconium, thorium, molybdenum, tungsten, platinum, antimony, etc. Among these the most preferred materials are aluminum, chromium, iron, zinc, tin, nickel, molybdenum, lead, titanium, and silicon. Especially preferred is aluminum.

The symbol Q in the above formula represents either an alkali metal or a quaternary ammonium radical of the structure:

$$R-\overset{\overset{\displaystyle R^{\oplus}}{|}}{\underset{\underset{\displaystyle R}{|}}{N}}-R$$

The radical R in the quaternary ammonium structure may be selected from alkyl, alkenyl, alkaryl, aryl, cycloaliphatic and cycloheteryl and the foregoing radicals having substituents thereon. Preferred materials contain at least one alkyl radical and most preferably four alkyl radicals containing 1–18 carbon atoms.

While Q may represent any alkali metal, it is most preferred for the purposes of this invention to use either sodium or potassium. Compounds of the above-defined formula where Q is an alkali metal are available commercially in some cases, and in any case may be prepared by conventional techniques. Particularly suitable is commercially available sodium aluminate, for example.

When Q represents the quaternary ammonium radical, it is most preferred to employ the tetramethylammonium radical. Other preferred quaternary ammonium radicals are those where R in at least one instance represents an alkyl radical of at least 3 carbon atoms. Examples of these quaternary ammonium radicals are alkyldimethylbenzylammonium radicals (where the alkyl group herein consists of a mixture of high molecular weight straight hydrocarbon chains ranging from $C_8$ to $C_{18}$ and predominantly $C_{12}$ to $C_{14}$), tricaprylylmonomethylammonium radicals, and stearyltrimethylammonium radicals.

When Q represents a quaternary ammonium compound the above additive may be conveniently prepared by methods disclosed in copending application filed on August 26, 1965, and having Serial No. 482,909, or in copending application filed on August 24, 1965, and having a Serial No. 482,264. The disclosure in both of the above-identified copending applications is hereby incorporated in this application by way of reference.

The following examples illustrate typical modes of preparing compounds which are useful in the process of this invention. These examples are disclosed in the above-identified copending applications and are merely intended to illustrate a method by which these compounds may be prepared. It is understood, of course, that the invention is not to be limited to sole use of these materials.

*Example I*

In this example tetramethylammonium aluminate was prepared.

In the first stage of this experiment tetramethylammonium hydroxide was prepared via conversion of tetramethylammonium chloride. Specifically 8000 ml. strong base anion exchange resin in hydroxide form were placed into a 3" I.D. tube and rinsed. A total of 740 grams of tetramethylammonium chloride dissolved in 14.8 liters of D.I. water (5% solution) were passed through the resin for a period of two hours.

Next, 3500 ml. of Amberlite 200 in sodium form were placed into a 3" I.D. tube (equivalent to 32" bed height) and converted to the hydrogen form by passing 6.0 lbs. of sulfuric acid 66° Bé. (or 50 lbs. of sulfuric acid per cubic foot resin) as a 5% solution through the resin. The resin was completely rinsed free of acid and converted to the tetramethylammonium form by passing 13.4 liters of tetramethylammonium hydroxide through the resin in two hours. A light colored band moving downward was observed and spot sampling indicated that the color band was identical with the extent of conversion.

One-half of the remaining 1400 ml. tetramethylammonium hydroxide solution was then added to the top of the Amberlite 200 resin and sodium aluminate passed through in two hours as follows.

728 grams of a 48% sodium aluminate solution containing 2½% excess NaOH were diluted with 2400 ml. of warm D.I. water (140° F.). The total solution was 2800 ml., equivalent to approximately 12.5% solution by calculation. The warm solution was passed through the resin at 50–75 ml. per minute. This relatively slow flow rate was selected to assure a very small exhaustion band in the resin whereby sodium leakage at the end of the run was minimized. Various fractions were collected yielding a composite having a total concentration of tetramethylammonium aluminate of 8.62%. This product was further concentrated and isolated in the solid form using conventional techniques.

*Example II*

In this experiment alkyldimethylbenzylammonium aluminate was prepared. The alkyl group consisted of a mixture of high molecular weight straight hydrocarbon chains ranging from $C_8$ to $C_{18}$ and predominantly $C_{12}$–$C_{14}$. In this experiment 22 grams of a 50% solution of alkyldimethylbenzylammonium hydroxide (where the alkyl radical is mixed as just described) was added to 35.7 grams of a 48% solution of sodium aluminate and 387 grams of deionized water. This mixture was passed through a column of a strong acid cation exchange resin in ammonium form, and the desired product was obtained in the effluent. Again, the product was further concentrated and isolated in the solid form using conventional techniques.

As stated above, the process of this invention comprises vulcanizing rubber by incorporating sulfur and an accelerating amount of the compounds of this invention into rubber followed by heating to effect vulcanization of said rubber. The particular rubbery polymers or elastomers which may be vulcanized by the process of this invention may be defined as being any solid rubbery polymer which may be vulcanized by heating in the presence of sulfur by means of the process known as dry rubber vulcanization. In this process, raw rubber in the dry state is mixed with sulfur and an accelerator, as well as a wide variety of fillers, dyes or pigments, and other specialty additives formed into the desired shape, and vulcanized by heating. It is preferred, for the purpose of this invention, to heat said rubber to a temperature ranging from 200 to 500° F., and preferably from 250 to 400° F.

Examples of the various rubbers which may be utilized in the process of this invention are natural rubber, and synthetic rubbers such as butadiene-styrene copolymers, butadiene-acrylonitrile copolymers, isobutylene-isoprene copolymers, polymers of 2-chloro-1,3-butadiene and copolymers of this monomer and other monomers, thiokols which are rubbery polymers prepared by treating sodium polysulfide with dihalogenated materials such as bis(2-chloroethyl) ether where the sulfur is already present, propylene dichlorodie and bis(2-chloroethyl) formal, polyacrylates such as copolymers of ethyl acrylate and chloroethylvinyl ether, and the like.

It is contemplated that the amount of sulfur which should be used in the vulcanization process of this invention be the conventional amount which is normally used in rubber compounding processes. It is not necessary to vary the sulfur content beyond that which is normally done to modify the properties of the resulting products. The accelerating agents of this invention have been found to be effective without any variation in the amount of sulfur employed in the vulcanization process.

The amount of accelerating agent of this invention necessary to effect rate of vulcanization improvements, and assist in improving the properties of the resultant product, may be broadly defined as an accelerating amount. It is preferred to employ from 0.005 to 10 parts by weight of the accelerating agent for every 100 parts by weight of the dry rubbery polymer. A more preferred amount ranges from 0.1 to 10 parts per 100 parts of dry rubber. It is believed that the higher carbon content accelerating agents of this invention, namely those where Q represents a quaternary ammonium radical having at least one higher alkyl radical of 12–18 carbon atoms, will be effective in lower amounts than those containing fewer carbons. The amount of the accelerating agent, of course, will be varied by the rubber compounder to achieve varying properties depending upon the ultimate use of the resulting product.

It is a preferred embodiment of this invention to utilize the accelerating agent described herein in the solid form. Most preferred is to dry or dehydrate the treating agent to increase the ability of the accelerating agent to rapidly and uniformly disperse throughout the dry rubbery polymer. Wet solids, such as those hydroscopic materials which pick up or absorb from the air as much as 20% moisture by weight do not properly disperse in dry rubber formulations without removal of the water. It is therefore greatly preferred to dry the treating agents of this invention. However, solutions or dispersions of the accelerator in solvents which are compatible with the dry rubber may also be employed. It is essential for the purposes of this invention that the accelerator be intimately mixed throughout the dry rubber in order to most efficienly accelerate the vulcanization process. Therefore, it is not contemplated that impurities be present, such as water or other materials which would adversely affect proper dispersion of the agent. An especially preferred practice of this invention, which has been found to overcome process difficulties caused by improper dispersion is to employ the compounds of this invention wherein these compounds have less than 2% moisture and preferably less than 1% moisture, by weight.

The following examples are presented to illustrate the efficacy of the invention. It is not intended that the invention be limited thereto.

*Example III*

In this example, a typical vulcanization process was used to vulcanize a butadiene-styrene copolymer available commercially under the trademark Plioflex. The particular formulation which was used represents a conventional shoe sole formulation and included a hard clay filler, softening agents, a pigment and a sulfenamide type organic accelerator commercially known as Santocure. To this mixture was added 3.5 parts of sulfur per 100 parts of the rubbery copolymer. Prior to vulcanization, 2.5 parts per 100 parts of dry rubber of a typical accelerating agent of this invention, namely sodium aluminate which had been dried to less than 1% water by weight were dispersed in the formulation. Portions of this uncured rubber composition were then vulcanized by heating at a temperature of 315° F. to effect vulcanization of said rubber. Presented below in Table I is the resulting ultimate tensile strength of samples of above rubber cured for various periods of time. The tensile strength was measured according to ASTM standard testing procedures and is reported in pounds of load required to break or rupture the sample. As can be seen from Table I below, optimum cure, as evidenced by a maximum tensile strength, was achieved in approximately 15 minutes. The rubber produced according to this example was considered to be completely satisfactory for its intended purpose for use in shoe sole manufacture.

TABLE I

*Tensile strength of rubber vulcanization using sodium aluminate as an accelerator*

| Cured time, minutes | Ultimate tensile strength, pounds |
|---|---|
| 7 | 1470 |
| 10 | 1550 |
| 15 | 1650 |
| 20 | 1630 |
| 40 | 1490 |

When the above-described formulation was cured without the use of the compound of this invention, maximum or ultimate tensile strength was not achieved until after two hours time.

*Example IV*

This example illustrates the improvement in rubber strength which may be achieved by using the accelerating agents of this invention when compared to rubber products which have been vulcanized using zinc oxide. A number of rubber formulations similar to those described in Example III were prepared with the only variable being the vulcanization accelerator. The rubber was vulcanized at a temperature of 315° F. for 15 minutes. In batch A, 5 parts of zinc oxide per 100 parts of dry rubber were employed, while in batch B, 2.5 parts of sodium aluminate were utilized according to the process of this invention. Batch C was also run according to the process of this invention wherein the accelerating agent was 0.5 parts of tetramethylammonium aluminate per 100 parts of dry rubber. The accelerating agents in batches B and C were first dried under vacuum to remove excess moisture.

After vulcanization, samples of each batch were then cut into strips, and the modulus of these samples was measured according to ASTM standard testing methods. The term "modulus" designates the load in pounds required to stretch the sample to a given elongation, in this case 300%. Stronger rubber requires more load to reach the standard elongation. Presented below in Table II are the results of these tests. The samples were tested in an unaged state, and were also similarly evaluated after the sample had been artificially aged. Air aging is accompished by placing the sample in a circulating air oven for 96 hours at a temperature of 70° C. The samples were also aged in the presence of oxygen by placing samples in an oxygen bomb for 120 hours at a pressure of 300 p.s.i. and 158° F. The two batches of rubber prepared using the accelerating agents of this invention demonstrated superior strength as indicated by their modulus, when compared to the strength or modulus of rubber vulcanized with zinc oxide.

TABLE II

[Comparison of rubber strength as measured by modulus]

| Batch No. | Modulus Unaged, pounds | Modulus Air Aged, pounds | Modulus $O_2$ Aged, pounds |
|---|---|---|---|
| A | 960 | 1,080 | 1,130 |
| B | 1,070 | 1,330 | 1,260 |
| C | 1,060 | 1,250 | 1,300 |

It should be pointed out that substantially smaller amounts of the compounds of this invention are shown above to provide significantly stronger rubber products than rubber products cured using zinc oxide. It is possible to increase the strength or modulus even higher, of course; for example, when 5 parts of tetramethylammonium aluminate were used to vulcanize a batch of rubber as in this example, the resulting unaged modulus was 1230 pounds.

*Example V*

A second physical property of rubber which is notably improved by the process of this invention is elongation. This property is generally considered to be representative of the toughness of vulcanized rubber. Basically, elongation may be defined as being the amount of resistance against stretching which the rubber possesses. That is, a tough rubber sample will stretch or be elongated less than rubber which is not as relatively tough. In evaluating elongation, the sample of cured rubber is stretched until the sample breaks or ruptures. The length of the sample at the rupture point is reported as a percent of the original unstretched length of sample. Lower percent elongation indicates less stretching and a higher degree of toughness in the rubber. In order to demonstrate the improved properties of rubber which is produced according to the process of this invention, a number of batches of rubber were prepared according to the formulation of Example IV. In this example, the rubber was vulcanized or cured at 315° F. for 20 minutes. It was found that approximately the same tensile strength was achieved in each case. However, it was surprisingly discovered that the percent elongation for rubber samples which were prepared using the novel accelerating agents of this invention was significantly less, thereby indicating a substantially tougher rubber. Specifically, batch A was produced as in Example IV with 5 parts of zinc oxide per 100 parts of dry rubber. Again, batch B was vulcanized using 2.5 parts of vacuum dried sodium aluminate and batch C was cured utilizing ½ part of dry tetramethylammonium aluminate per 100 parts of dry rubber. The samples were then tested for tensile strength and elongation according to ASTM standard testing methods. The results of these tests, presented below in Table III, clearly show that the process of this invention is capable of producing rubber which is substantially tougher than that produced by prior art methods.

TABLE III

[Evaluation of rubber toughness as measured by elongation]

| Batch No. | Tensile Strength, pounds | Elongation, percent |
|---|---|---|
| A | 1,640 | 513 |
| B | 1,630 | 463 |
| C | 1,640 | 430 |

*Example VI*

Yet another property of rubber which is indicative of the extent of cure which has been effected in the rubber is the ability of rubber to rebound after being stretched. This property is measured by a testing method in which a sample is stretched until the sample ruptures or breaks. In all cases, rubber which has been stretched by this testing procedure is permanently stretched. The ratio of the length of sample after stretching compared to the original unstretched length, expressed as a percent, measures the distortion characteristics of the rubber, and is identified in the art by the term "set". A number of experiments were performed to measure set of rubber produced according to Examples IV and V. In this experiment, samples of rubber produced from batches A, B, and C, as identified above in Examples IV and V, were evaluated according to ASTM standard tests after aging for 120 hours in the presence of oxygen at 300 p.s.i. and 158° F. In each case, the rubber was vulcanized at 315° F. for 10 minutes prior to aging. As shown below in Table IV, rubber which has been vulcanized according to the practices of this invention possesses substantially less permanent distortion as evidenced by a lower value for percent set.

TABLE IV

*Evaluation of rubber distortion as measured by set*

| Batch No. | Set, percent |
|---|---|
| A | 109 |
| B | 77 |
| C | 68 |

As has been demonstrated in the preceding examples, rubber which has been cured using the process of this invention, wherein sulfur and an accelerating amount of the compound having the formula:

$$Q_{2x-y}MO_x$$

was mixed with rubber and heated to effect vulcanization of said rubber, has been shown to result in cured rubber having superior properties. It has also been found that the accelerating agents of this invention may be satisfactorily used with other accelerators of organic nature. Typical organic accelerators are amines, aldehyde-amines, guanidines, thiocarbamates, thiuram sulfides, mercaptobenzothiazole and its derivatives, sulfenamides and the like.

It is apparent that many modifications and variations of the invention may be practiced other than those specifically enumerated without departing from the true scope of the invention.

The invention is hereby claimed as follows:

1. A process for vulcanizing rubber wherein sulfur and an accelerating amount of a compound having the formula:

$$Q_{2x-y}MO_x$$

are incorporated into said rubber followed by heating to effect vulcanization of said rubber, wherein M is an atom of a group listed in the Periodic Table selected from the group consisting of IB, IIIA, IVA, IVB, VIB and VIII, $x$ is an integer of 1–4, $y$ is the valence of said atom, and Q is a radical selected from the group consisting of alkali metal and a quaternary ammonium radical of the structure:

$$R-\overset{\overset{\displaystyle R}{|}}{\underset{\underset{\displaystyle R}{|}}{N}}{}^{\oplus}-R$$

where R is a radical selected from the group consisting of alkyl, alkenyl, alkaryl, aryl, cycloaliphatic and cycloheteryl and the foregoing radicals having substituents thereon.

2. The process of claim 1 where M is Al, $x$ is 2, $y$ is 3, and Q is sodium.

3. The process of claim 1 where M is Al, $x$ is 2, $y$ is 3 and Q is a tetramethylammonium radical.

4. A process of vulcanizing rubber wherein sulfur and from 0.05 to 10 parts per 100 parts of said rubber of a compound having the formula:

$$Q_{2x-y}MO_x$$

are incorporated into said rubber followed by heating to effect vulcanization of said rubber, wherein M is an atom selected from the group consisting of Al, Cr, Fe, Zn, W, Sn, Ni, Mo, Pb, Ti and Si, $x$ in an integer of 1–4, $y$ is the valence of said atom, and Q is selected from the group consisting of alkali metal and a quaternary ammonium radical of the structure:

$$R-\overset{\overset{\displaystyle R}{|}}{\underset{\underset{\displaystyle R}{|}}{N}}{}^{\oplus}-R$$

where R is a radical selected from the group consisting of alkyl, alkenyl, alkaryl, aryl, cycloaliphatic and cycloheteryl and the foregoing radicals having substituents thereon.

5. The process of claim 4 where M is Al, $x$ is 2, $y$ is 3, and Q is sodium.

6. The process of claim 4 where M is Al, $x$ is 2, $y$ is 3, and Q is a tetramethylammonium radical.

7. A composition of matter comprising sulfur vulcanizable rubber, sulfur and an accelerating amount of a compound having the formula:

$$Q_{2x-y}MO_x$$

wherein M is an atom of a group listed in the Periodic Table selected from the group consisting of IB, IIIA, IVA, IVB, VIB and VIII, $x$ is an integer of 1–4, $y$ is the valence of said atom, and Q is a radical selected from the group consisting of alkali metal and a quaternary ammonium radical of the structure:

$$R-\overset{\overset{\displaystyle R}{|}}{\underset{\underset{\displaystyle R}{|}}{N}}{}^{\oplus}-R$$

where R is a radical selected from the group consisting of alkyl, alkenyl, alkaryl, aryl, cycloaliphatic and cycloheteryl and the foregoing radicals having substituents thereon.

8. The composition of claim 7 where M is Al, $x$ is 2, $y$ is 3, and Q is sodium.

9. The composition of claim 7 where M is Al, $x$ is 2, $y$ is 3, and Q is a tetramethylammonium radical.

10. A composition of matter comprising sulfur vulcanizable rubber sulfur and from 0.05 to 10 parts per 100 parts of said rubber of a compound having the formula:

$$Q_{2x-y}MO_x$$

wherein M is an atom selected from the group consisting of Al, Cr, Fe, Zn, W, Sn, Ni, Mo, Pb, Ti and Si, $x$ is an integer of 1–4, $y$ is the valence of said atom, and Q is a radical selected from the group consisting of alkali metal and a quaternary ammonium radical of the structure:

$$R-\overset{\overset{\displaystyle R}{|}}{\underset{\underset{\displaystyle R}{|}}{N}}{}^{\oplus}-R$$

where R is a radical selected from the group consisting of alkyl, alkenyl, alkaryl, aryl, cycloaliphatic and cycloheteryl and the foregoing radicals having substituents thereon.

11. The composition of claim 10 where M is Al, $x$ is 2, $y$ is 3, and Q is sodium.

12. The composition of claim 10 where M is Al, $x$ is 2, $y$ is 3, and Q is a tetramethylammonium radical.

References Cited

UNITED STATES PATENTS 2,636,830 4/1953 Wall ______________ 260—779

JOSEPH L. SCHOFER, *Primary Examiner.*

D. K. DENENBERG, *Assistant Examiner.*

UNITED STATES PATENT OFFICE
CERTIFICATE OF CORRECTION

Patent No. 3,370,049 February 20, 1968

Logan V. Miller et al.

It is certified that error appears in the above identified patent and that said Letters Patent are hereby corrected as shown below:

Column 4, line 33, "0.005" should read -- 0.05 --; line 58, "efficienly" should read -- efficiently --.

Signed and sealed this 28th day of October 1969.

(SEAL)
Attest:

Edward M. Fletcher, Jr.
Attesting Officer

WILLIAM E. SCHUYLER, JR.
Commissioner of Patents